United States Patent
Dürbaum et al.

(10) Patent No.: US 7,023,710 B2
(45) Date of Patent: Apr. 4, 2006

(54) METHOD OF OPERATING A SWITCHED-MODE POWER SUPPLY AND SWITCHED-MODE POWER SUPPLY

(75) Inventors: Thomas Dürbaum, Langerwehe (DE); Christoph Loef, Aachen (DE); Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/505,502

(22) PCT Filed: Feb. 21, 2003

(86) PCT No.: PCT/IB03/00664

§ 371 (c)(1), (2), (4) Date: Aug. 24, 2004

(87) PCT Pub. No.: WO03/073594

PCT Pub. Date: Sep. 4, 2003

(65) Prior Publication Data

US 2005/0162871 A1    Jul. 28, 2005

(30) Foreign Application Priority Data

Feb. 26, 2002 (DE) ............................... 102 08 294
Apr. 19, 2002 (DE) ............................... 102 17 481

(51) Int. Cl.
*H02M 3/335* (2006.01)
*H02M 3/315* (2006.01)

(52) U.S. Cl. .................. 363/19; 363/21.07; 363/21.15

(58) Field of Classification Search ................... 363/19, 363/20, 21.07, 21.15; 323/902
See application file for complete search history.

(56) References Cited

U.S. PATENT DOCUMENTS

| 5,440,473 | A |   | 8/1995  | Ishii        |         |
|-----------|---|---|---------|--------------|---------|
| 5,570,276 | A | * | 10/1996 | Cuk et al.   | 363/16  |
| 5,761,057 | A |   | 6/1998  | Muchenberger |         |
| 5,903,138 | A |   | 5/1999  | Hwang        |         |
| 5,956,245 | A | * | 9/1999  | Rozman       | 363/89  |
| 6,049,471 | A | * | 4/2000  | Korcharz et al. | 363/20 |
| 6,803,749 | B1 | * | 10/2004 | Manabe et al. | 323/222 |

\* cited by examiner

*Primary Examiner*—Bao Q. Vu

(57) ABSTRACT

In the case of known switched-mode power supplies with integrated preconditioner, the control curves are largely congruent, but deviate from one another in low-load operation, whereby the unregulated intermediate circuit voltage increases. To improve efficiency in low-load operation, closed-loop control of the burst cycle is effected on the primary side of the voltage transformer. The intermediate circuit voltage is limited to a permissible limit value. The closed-loop control device in the switching stage taps the intermediate circuit voltage at a voltage divider which is arranged between the preconditioner functional unit and the switching stage. An assembly additionally monitors the output voltage, for example by means of an optocoupler. Burst mode comprises one or more burst cycles. A burst cycle is started when the intermediate circuit voltage reaches its limit value. At this time, the voltage transformer is switched off. A burst cycle ends when the output voltage reaches a minimum value. At this time at the latest, the voltage transformer is switched on again. Burst mode is terminated again either when the switched-mode power supply is again operated under normal load or when a maximum time has elapsed, measured from the start of burst mode.

15 Claims, 3 Drawing Sheets

METHOD OF OPERATING A SWITCHED-MODE POWER SUPPLY AND SWITCHED-MODE POWER SUPPLY

The invention relates to a method of operating a switched-mode power supply, which comprises a rectifier and a voltage transformer with primary and secondary side. As a rectifier it is possible to use, for example, a separate or an integrated preconditioner, in particular active AC/DC converters may be used as preconditioners. As a result of regulations relating to mains pollution caused by electronic devices, active AC/DC converters are used ever more frequently. In present switched-mode power supplies with "MAINS HARMONIC REDUCTION", separate preconditioners are used, which are provided in a completely separate stage in the power supply. Although standards are thereby met and frequently even surpassed, the costs are at the same time unusually high. In the case of other known switched-mode power supplies, a passive solution comprising a coil with sufficiently high inductance is used instead of active AC/DC converters. However, this passive solution brings with it the disadvantages of larger volume, increased weight, higher costs and lower efficiency.

Moreover, switched-mode power supplies with integrated preconditioner (AC/DC converter) and voltage transformer (DC/DC converter) are known, which are operated with at least one transistor, a half bridge comprising 2 transistors or a full bridge comprising 4 transistors and thus also with a closed-loop control. Through suitable topology and circuit dimensioning, it is ensured that the control curves of the preconditioners and of the voltage transformer of these known switched-mode power supplies with integrated preconditioner are largely congruent, wherein the preconditioners fulfill the functions "Control of input current waveform" and "Control of intermediate circuit voltage" and the voltage transformer fulfills the function "Stabilization of output voltage and output current". However, the disadvantage is that in low-load operation, i.e. in the case of a load below a given power threshold (dependent on the design of the voltage transformer and optionally on the line voltage), the control curves cease to be congruent and the unregulated intermediate circuit voltage increases. In this case, the maximum permissible limits for the components are exceeded and the voltage transformer is destroyed or relatively high losses occur.

A known method of improving efficiency in low-load operation of a switched-mode power supply is the burst mode. In burst mode, the switched-mode power supply is switched on and off at a frequency which may be fixed or variable. The power reduces within the ratio of the on time to the sum of the on and off time [on/(on+off)]. In the case of known switched-mode power supplies, this burst mode is activated from the secondary side, for example in order to reduce consumption in stand-by operation.

It is therefore an object of the invention to provide a method for open- and/or closed-loop control of the intermediate circuit voltage of a switched-mode power supply with integrated preconditioner, which allows low-load operation and at the same time achieves high efficiency in said operation. It is a further object of the invention to provide a switched-mode power supply which exhibits high efficiency in low-load operation.

The object is achieved according to the invention, with regard to the method, in that a limit value is fixed for the intermediate circuit voltage. When the limit value is reached, a burst mode is activated. Control of the burst mode is effected on the primary side of the voltage transformer. The intermediate circuit voltage is limited to a maximum permissible limit value.

The object is achieved with regard to the switched-mode power supply by a switched-mode power supply comprising a preconditioner and a voltage transformer, in which an intermediate circuit voltage is measured and which comprises means for monitoring the intermediate circuit voltage comparing the intermediate circuit voltage with a fixed limit value activating a burst cycle when the limit value is reached on the primary side of the voltage transformer.

In the case of a variant of the switched-mode power supply according to the invention, the intermediate circuit voltage and the open-/closed-loop control device of the switching stage have the same ground potential.

According to the invention, open- and closed-loop control of the burst mode is dependent on the intermediate circuit voltage. Since the open- and/or closed-loop control device and the intermediate circuit voltage have the same ground potential, simple measurement is possible, e.g. by means of a voltage divider. An increase in this voltage shows that little power is being consumed on the secondary side. Consequently, a limit value is fixed and monitored for the intermediate circuit voltage. When this limit value is reached, burst mode is activated on the primary side of the switched-mode power supply. This means that the switched-mode power supply is switched off, wherein the voltage in the intermediate circuit remains virtually constant, while the secondary voltages, i.e. the output voltages, fall slowly. After a previously determined time or when a minimum value is reached for the secondary voltage, the power supply is switched on again. Due to the fall in secondary voltage, the intermediate circuit load is high for the first moment after switching on, while the intermediate circuit voltage falls. If the output load remains low, the intermediate circuit voltage rises again after a short time and the burst mode is re-triggered as soon as the intermediate circuit voltage reaches the limit value. If the output load increases, the limit value for the maximum intermediate circuit voltage is not reached and the burst mode is automatically deactivated.

Activation and deactivation of the burst mode is effected by an open-/closed-loop control device, which is preferably arranged in a switching stage. In a preferred embodiment of the invention, a single open-loop control is used, to measure and monitor the intermediate circuit voltage and to activate and deactivate the burst mode. Activation of the burst mode means switching off the voltage transformer.

In a variant of the switched-mode power supply according to the invention, the voltage transformer is switched on again, when a previously determined time has elapsed which is measured from the time of the start of the burst cycle. This means that the voltage transformer remains switched off for a previously determined time, before it is switched on again.

In another variant, the voltage transformer is switched on again, when an adjustable or adaptive time has elapsed which is likewise measured from the time of the start of the burst cycle. Once this adjustable or adaptive time has elapsed, the voltage transformer is switched on again.

In another variant according to the invention, the voltage transformer is switched on as a function of the input line voltage, e.g. at zero transition. The input line voltage, for which a limit value exists, is monitored by the closed-loop control. When this limit value is reached, the closed-loop control deactivates the burst mode and the voltage transformer is thus switched on again.

In a further variant of the invention, switching on of the voltage transformer depends on an additionally monitored secondary voltage, i.e. the output voltage of the switched-mode power supply. When the minimum value of the output voltage is reached, burst mode is deactivated by the open-/closed-loop control and thus the voltage transformer is switched on again.

The open-/closed-loop control device is preferably provided in a switching stage which monitors and provides open- and/or closed-loop control of both the intermediate circuit voltage and the output voltage.

In a variant of the method according to the invention, the preconditioner functional unit and the switching stage are integrated.

The voltage transformer may be a DC/DC converter, for example, which comprises at least one transistor which is intermittently activated.

In a further variant of the invention, the burst mode is not activated if a high output load is present at the same time. This means that, when the limit value Ulimit of the intermediate circuit voltage Uic is exceeded, the burst mode is not activated if at the same time the output voltage Uo is below the rated voltage Unorm. Such a (short-term) exceeding of the limit value of the intermediate circuit voltage Uic may be triggered for example by a disturbance pulse in the power mains (surge).

In another variant, the load, which is connected on the output side to the switched-mode power supply, may comprise a device for direct or indirect monitoring of the output voltage of the switched-mode power supply and effect load variations as a function of the output voltage or the activity of the switching stage. In this way, load variations only take place during active phases of the switching stage. Detection of the active phases of the switching stage may occur:

through measurement and evaluation of the output voltage of the switched-mode power supply through measurement and evaluation of a voltage on the secondary side of the voltage transformer, for example the alternating voltage between the transformer and the rectifier and filter.

This monitoring ensures that load variations take place only during the active phase of the voltage transformer, such that the output voltage does not fall below a minimum value. This could otherwise occur when the output load is switched in at the start of the burst cycle.

An active phase in high output-load burst operation is present for example when the ratio of the variation in output voltage Uo to the variation in time t is positive, i.e.

$$\frac{dU_O}{dt} \geq 0.$$

An example of direct monitoring is measurement of the voltage between the transformer and rectifier/filter assemblies. If an alternating voltage is recorded here, the switching transformer is active and loads may be switched in.

In another variant, the output load may additionally comprise a device for transmitting a load variation which occurs to the open-/closed-loop control device. It may thus be ensured that any burst mode which may be activated is deactivated prior to or during the load variation.

Other combinations of the stated switch-on conditions are likewise possible.

One advantage of the invention is control of the intermediate circuit voltage in integrated preconditioners without additional active components.

Another advantage of the solution according to the invention is that, in the case of the above-described method, an energy-saving burst mode is generated.

Another advantage of the method according to the invention is the automatic change-over between the normal mode and burst mode operating modes, which change-over is performed by the closed-loop control.

An additional advantage of the method according to the invention is the greater degree of freedom, in that the control curves of the rectifier and the voltage transformer have to be congruent only to a relatively small extent.

Advantageously, load steps on the output side of the switched-mode power supply are synchronized, which prevents possible problems upon transition from burst mode to normal mode. Depending on circuit design, it may otherwise happen that the output voltage falls below a minimum value when the load is switched in at the start of a burst cycle. The following options are therefore provided:

a) open-loop control of the load, which allows switching in of a relatively large load only during the active phase of the voltage transformer or b) open-loop control of the voltage transformer by means of an additional control line, which terminates the burst mode when the load is switched in.

The invention will be further described with reference to examples of embodiments shown in the drawings to which, however, the invention is not restricted, wherein FIG. 1 is a block diagram of an example of embodiment of the switched-mode power supply according to the invention;

Figure 1:
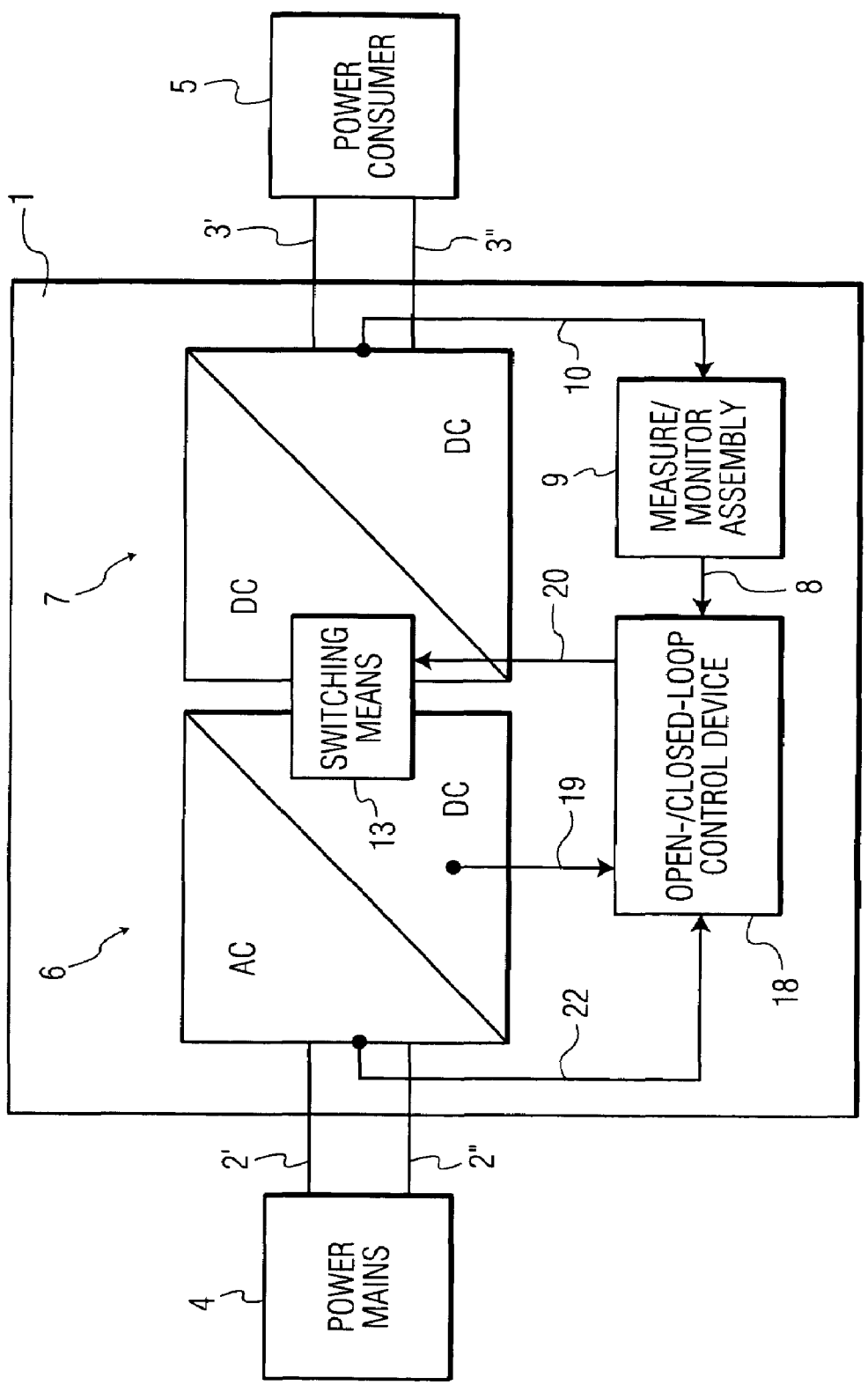

FIG. 1 is a block diagram of an example of embodiment of the switched-mode power supply according to the invention. The switched-mode power supply 1 comprises at least two input terminals 2' and 2" and at least two output terminals 3' and 3". The input lines are connected for example to the power mains 4, which has different values in different countries, but typically provides between 100 and 240 volts of alternating voltage. A power consumer 5 is connected as load to the output lines 3' and 3" of the switched-mode power supply 1. The output voltage Uo or the output voltages Uo(1 . . .n) is/are so dimensioned as to match the applications thereof.

The switched-mode power supply 1 comprises firstly a preconditioner 6, which rectifies (DC) the input-side alternating voltage (AC). The voltage transformer 7 connected thereto converts the direct voltage (DC) into a desired direct voltage (DC). The switching means 13 of the voltage transformer 7 are also used at the same time for operation of the preconditioner. The voltage transformer 7 may take the form, for example, of a DC/DC converter, which only intermittently accepts the direct voltage by means of a clocked switching means 13. Thus, the output voltage Uo of the switched-mode power supply 1 may be selected within given limits. Between the preconditioner 6 and the voltage transformer 7, the intermediate circuit voltage Uic is tapped at a voltage divider, which comprises for example 2 resistors R1, R2, and supplied via a connecting line 19 to the open-/closed-loop control device 18. The assembly 9 is used inter alia to measure and monitor the output voltage Uo. The assembly 9 has access to the secondary side of the voltage transformer 7 via the connection 10. The open-/closed-loop control device 18 keeps the output voltage Uo monitored by the assembly 9 and/or the output current constant at least within given limits, by activating the switching means 13 appropriately via the connection 20.

The open-/closed-loop control device 18 may have a connection 22 to the input of the preconditioner 6, for the purpose of optional input voltage detection. Detection of the input voltage allows purposeful switching on of the voltage transformer 7 as a function of the input line voltage, for example at zero transition.

Figure 2:
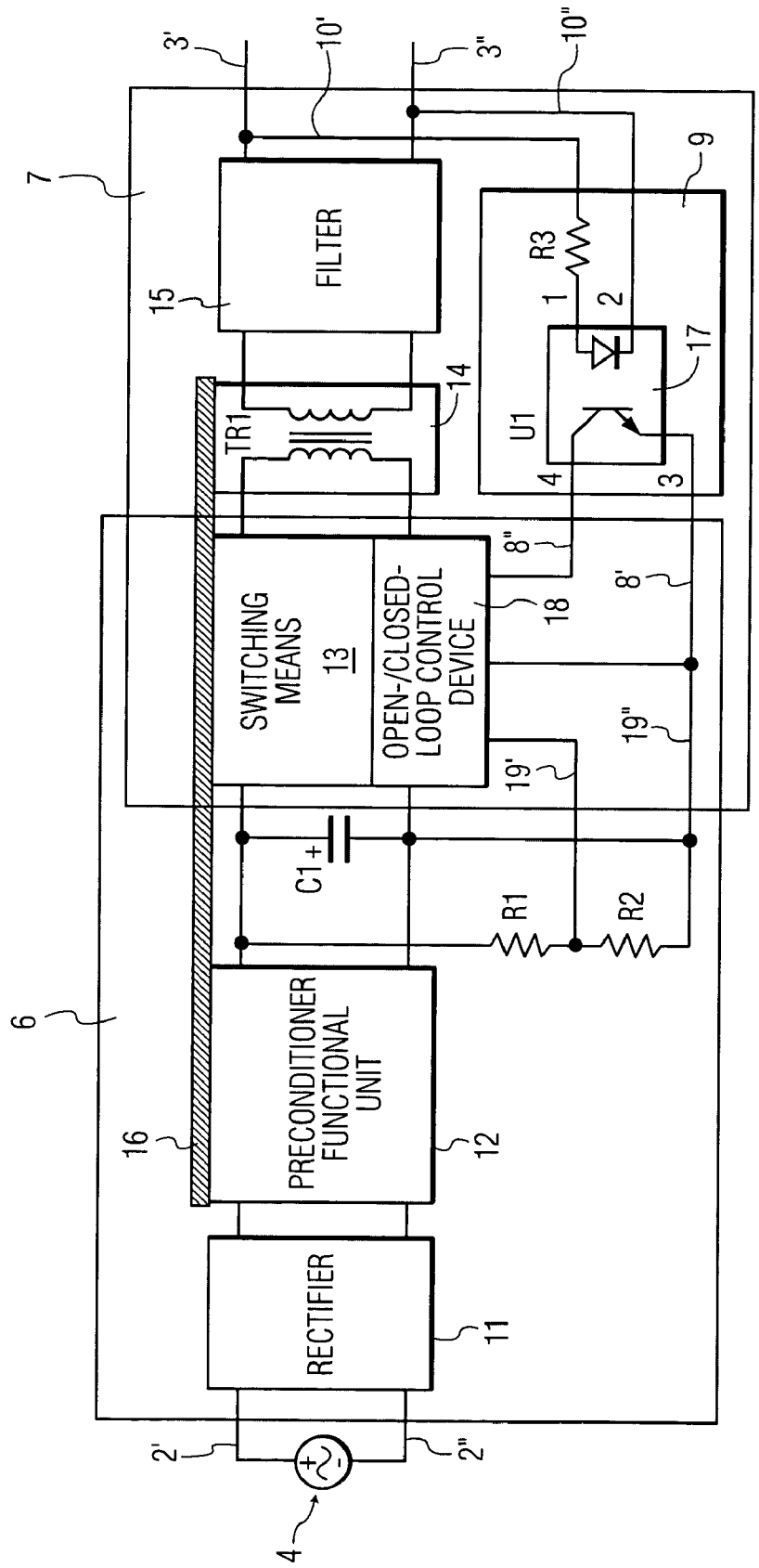
FIG. 2 shows a detailed embodiment of the invention.
Figure 3A:
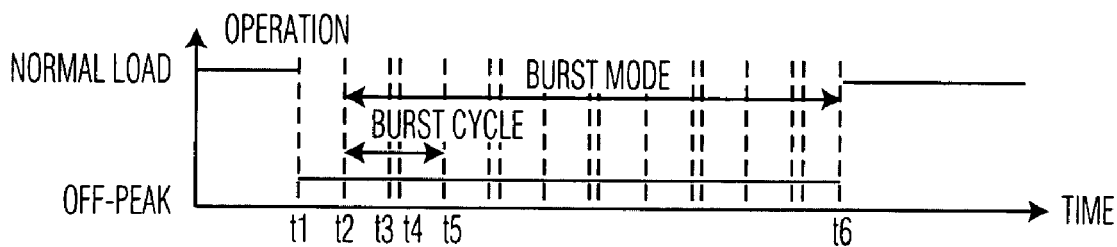
FIG. 3 shows in Subfigs. a) to d) an example of a burst mode profile.
Figure 3B:
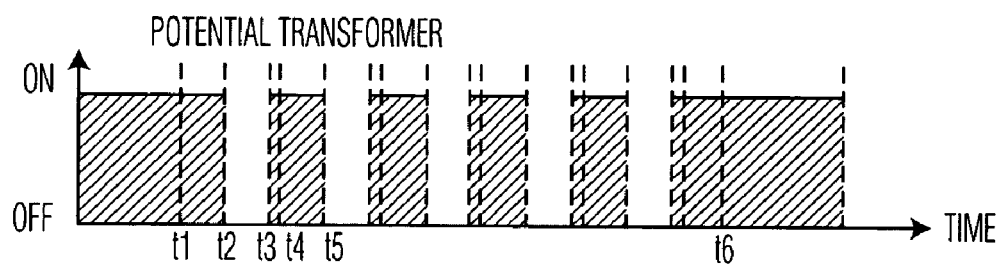
Figure 3C:
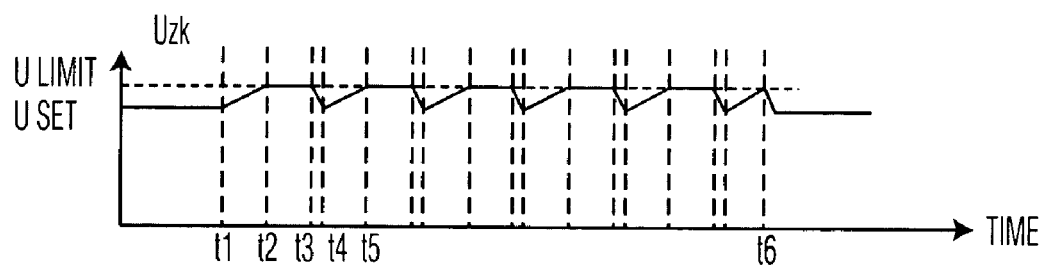
Figure 3D:
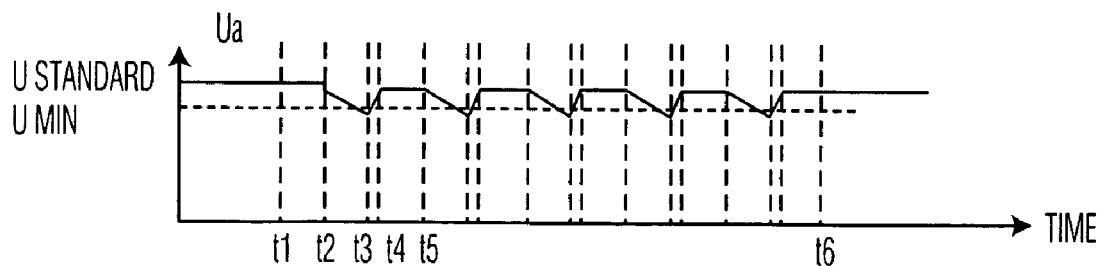

FIG. 2 is a detailed representation of an example of embodiment of the invention. In the rectifier 11, first of all an unsmoothed direct voltage Udirect is generated from the power mains. Together with the capacitor C1, the integrated preconditioner functional unit 12 transforms this into an approximately constant intermediate circuit voltage Uic, wherein a current Iline corresponding to the appropriate standards is at the same time drawn from the power mains by the preconditioner functional unit 12. From the intermediate circuit voltage Uic, the switching stage, which comprises the switching means 13 and the open-/closed-loop control device 18, indirectly generates the output voltage Uo. The assembly 9 measures the output voltage Uo and transmits it to the open-/closed-loop control device 18, which additionally measures the intermediate circuit voltage Uic. In the example of embodiment illustrated, the output voltage Uo across the output lines 3' and 3" is potentially isolated. Potential isolation is effected for example by means of a transformer 14, which transforms the intermediate circuit voltage Uic to the desired voltage Unorm. The intermediate circuit voltage Uic is converted into an alternating voltage Ualternating for the purpose of transformation by the switching stage, while the rectifier and filter 15 convert the alternating voltage into the desired direct voltage. The rectified output signal Uo is transmitted for example by an optocoupler 17 and measured and monitored by the assembly 9. The coupling 16 between the preconditioner functional unit 12, the switching stage and the transformer 14 ensures that, in normal operation, an acceptable intermediate circuit voltage Uic and an input current waveform meeting the appropriate standard are achieved simultaneously in the event of closed-loop control of the output voltage Uo. This coupling 16, which is merely suggested in the Figure, may be achieved for example by capacitors, inductors and/or magnetic components. The inductor of the preconditioner 6 may be integrated into the transformer 14 for example, but other configurations are also possible. Since, in the case of conventional switched-mode power supplies, only the output voltage Uo is susceptible to closed-loop control, the other two conditions, namely input current Iin and intermediate circuit voltage Uic, have to be achieved by appropriate circuit dimensioning. This leads to extreme limitations in design and has proven impossible in the case of low-load operation. According to the invention, the intermediate circuit voltage Uic is therefore tapped via the voltage divider R1, R2. The output voltage Uo is measured by means of the resistor R3 and the optocoupler 17 and transmitted to the open-/closed-loop control device in the switching stage. The assembly 9, serving as a measuring device, is connected for this purpose to the open-/closed-loop control device 18 of the switching stage via the lines 8' and 8". While the intermediate circuit voltage Uic is below the limit value Ulimit, the voltage transformer 7 is switched in such a way by the open-/closed-loop control device 18 in the switching stage that the output voltage Uo is constantly at its desired value Unorm. Only when the limit value Ulimit of the intermediate circuit voltage Uic is exceeded is the voltage transformer 7 switched off briefly, i.e. a burst cycle is started. During this interval, measurement of the output voltage Uo serves in determination of the time at which switching back on should occur. When the output voltage falls below a minimum tolerable level (Umin), the voltage transformer 7 is switched on again. When the intermediate circuit voltage Uic reaches the limit value Ulimit, the next burst cycle is triggered.

FIG. 3 shows, in Subfig. a) under what load the switched-mode power supply 1 is operated, in Subfig. b) the on or off status of the voltage transformer 7, in Subfig. c) the profile of the intermediate circuit voltage Uic and the recorded limit value Ulimit and in Subfig. d) the profile of the output voltage Uo and the recorded minimum value Umin. For the period t<t1, operation of the switched-mode power supply 1 is shown as under normal load, which means that the voltage transformer 7 is switched on, the intermediate circuit voltage Uic is below the limit value Ulimit and the output voltage Uo is regulated to its rated value Unorm. At the time t1 in the example, low-load operation starts. Initially, the voltage transformer 7 remains switched on, the intermediate circuit voltage Uic increases and at the time t2 reaches the limit value Ulimit. Thereupon, the voltage transformer 7 is switched off, whereby the increase in the intermediate circuit voltage Uic is stopped and the value of the output voltage Uo falls. By the time t3, the output voltage Uo has reached the tolerable minimum value Umin. To prevent the voltage from falling below this value, the voltage transformer 7 is switched on again. By the time t4, the output voltage Uo has reached a virtually constant value, whereafter the intermediate circuit voltage Uic increases again, however, since the switched-mode power supply 1 continues to operate under a low load. By the time t5, the intermediate circuit voltage Uic has again reached its limit value Ulimit and the next burst cycle starts. This is repeated until the intermediate circuit voltage Uic again reaches its limit value Ulimit, i.e. the switched-mode power supply 1 operates under a low load. In the example illustrated, low-load operation ends at the time t6 and consequently the intermediate circuit voltage Uic no longer reaches its limit value Ulimit, the output voltage Uo remains above a minimum value Umin and the voltage transformer 7 is accordingly switched on. Burst mode begins with the first switch-off of the voltage transformer 7 and ends when the voltage transformer 7 remains switched on. Burst mode comprises one or more burst cycles, wherein a burst cycle likewise begins when the voltage transformer 7 is switched off, and includes reaching of the limit value Ulimit of the intermediate circuit voltage Uic and of the minimum value Umin of the output voltage Uo, wherein meanwhile the voltage transformer 7 is switched back on. The burst cycle ends or the next burst cycle begins when the voltage transformer 7 is switched off again. The open-/closed-loop control device 18 monitors and determines the intermediate circuit voltage Uic and the output voltage Uo. The voltage transformer 7 is switched on or off as a function of the values thereof.

In a further embodiment of the invention, the output voltage does not determine the time at which switching back on occurs, but $t_3-t_2$ is either predetermined, adjustable by the user of the switched-mode power supply or adaptive.

To summarize, the efficiency of the switched-mode power supply 1 in low-load operation is improved by open-/closed-loop control of the intermediate circuit voltage Uic. The intermediate circuit voltage Uic is activated by activation of a burst cycle. Preconditioner 6 and voltage transformer 7 share a switching stage, whereby costs are kept down and integratability is increased.

The invention claimed is:

1. A method of operating a switched-mode power supply, in particular a switched-mode power supply comprising at least one preconditioner functional unit, a switching stage with an open-and/or closed-loop control device, a voltage divider, which is arranged between the preconditioner function unit and the switching stage, in which an intermediate circuit voltage (Uic), provided by the voltage divider, is present between the preconditioner functional unit and the switching stage, and a voltage transformer, comprising:
fixing a limit value (Ulimit) for the intermediate circuit voltage (Uic);
monitoring the intermediate circuit voltage (Uic);
comparing the intermediate circuit voltage (Uic) with the fixed limit value (Ulimit); and
activating, by the open- and/or closed-loop control device, a burst cycle when the limit value (Ulimit) is reached for the intermediate circuit voltage (Uic) on a primary side of the voltage transformer.

2. A method as claimed in claim 1, wherein the voltage transformer is switched off when the burst cycle is activated.

3. A method as claimed in claim 2, wherein the burst cycle is deactivated once a predetermined, adjustable or adaptive period has elapsed, which period is measured from the time of activation of the burst mode onwards, and the voltage transformer is switched back on.

4. A method as claimed in claim 1, wherein the input line voltage is monitored and, when the limit value of the input line voltage is reached, the open- and/or closed-loop control device in the switching stage deactivates the burst mode.

5. A method as claimed in claim 1, wherein
the output voltage (Uo) of the switched-mode power supply is monitored on the secondary side of the voltage transformer,
a minimum value (Umin) is fixed for the output voltage (Uo) and
the burst cycle is deactivated when the minimum value Umin of the output voltage Uo is reached and the voltage transformer is switched on again.

6. A method as claimed in claim 5, wherein the one open- and/or closed-loop control device in the switching stage monitors and effects open- and/or closed-loop control of both the intermediate circuit voltage (Uic) and the output voltage (Uo).

7. A method as claimed in claim 1, wherein the preconditioner functional unit and the switching stage are integrated.

8. A method as claimed in claim 1, wherein the voltage transformer is a DC/DC converter, which comprises at least one transistor, which is activated intermittently.

9. A method as claimed in claim 1, wherein the closed-loop control does not activate burst mode when a high output load is present at the same time.

10. A method as claimed in claim 1, wherein an output load is connected, which comprises a device for direct or indirect monitoring of the activity of the switching stage and effects load variations only during active phases.

11. A method as claimed in claim 10, wherein detection of the active phases of the switching stage is effected by measurement and evaluation of the output voltage (Uo) of the switched-mode power supply.

12. A method as claimed in claim 10, wherein detection of the active phases of the switching stage is effected by measurement and evaluation of a voltage on the secondary side of the voltage transformer.

13. A method as claimed in claim 1, wherein an output load is connected, which comprises a device for transmitting an occurring load variation to the open- and/or closed-loop control device.

14. A switched-mode power supply as claimed in claim 1, wherein the intermediate circuit voltage (Uic) and the open- and/or closed-loop control device of the switching stage have the same ground potential.

15. Use of a switched-mode power supply as claimed in claim 1, to achieve improved efficiency in the case of low-load operation of the switched-mode power supply.

* * * * *